United States Patent [19]

Benzinger

[11] 4,191,197

[45] Mar. 4, 1980

[54] TOUCH FREE TYMPANIC THERMOMETER

[76] Inventor: Theodor H. Benzinger, 6607 Broxburn Dr., Bethesda, Md. 20014

[21] Appl. No.: 886,705

[22] Filed: Mar. 14, 1978

[51] Int. Cl.$^2$ .............................................. G01K 7/00
[52] U.S. Cl. ....................................... 128/736; 73/349
[58] Field of Search ................. 73/349; 128/2 H, 736, 128/742

[56] References Cited

U.S. PATENT DOCUMENTS

| | | | |
|---|---|---|---|
| 3,054,397 | 9/1962 | Benzinger | 128/736 |
| 3,156,117 | 11/1964 | Benzinger | 128/736 |
| 3,626,757 | 12/1971 | Benzinger | 73/355 R |
| 3,781,837 | 12/1973 | Anderson et al. | 128/2 H |

Primary Examiner—Donald O. Woodiel
Attorney, Agent, or Firm—George R. Douglas, Jr.; Sherman Levy

[57] ABSTRACT

A thermometer system for blowing heated air having a temperature value close to the temperature value of body temperature directly onto the tympanic membrane from tubing apparatus, and measuring the temperature of the air as it returns from the membrane, the air having membrane temperature.

20 Claims, 5 Drawing Figures

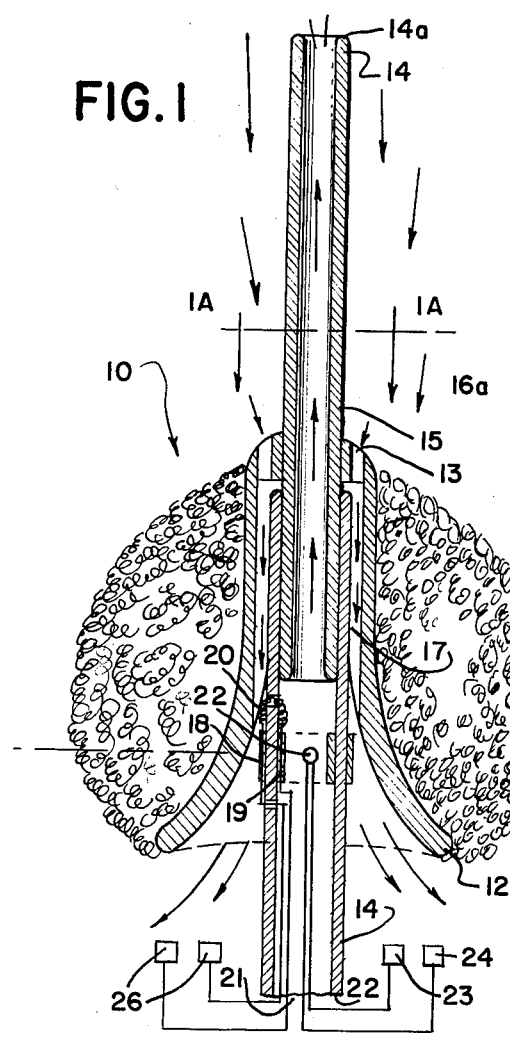
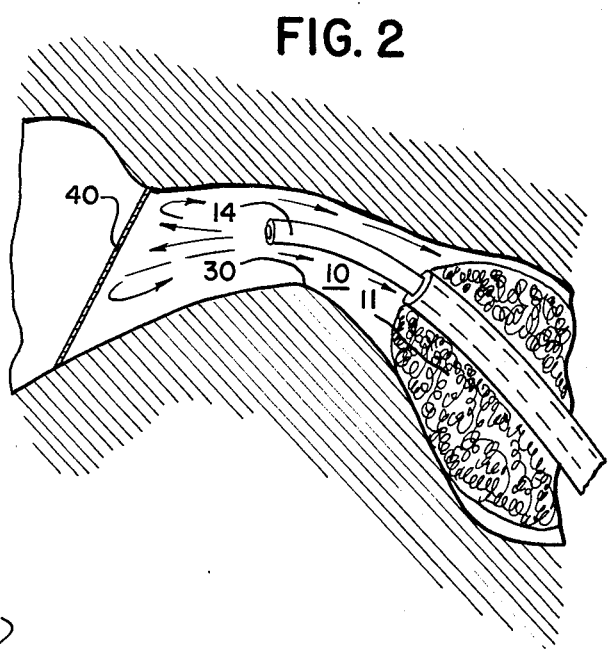
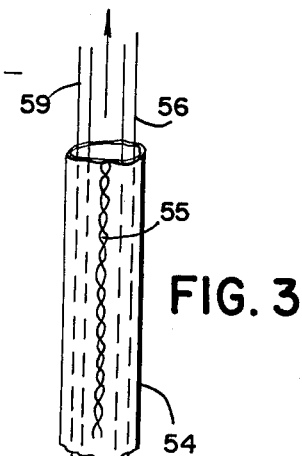
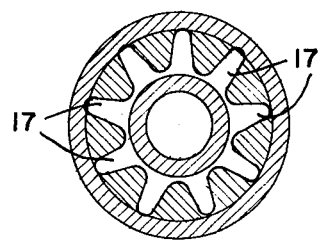
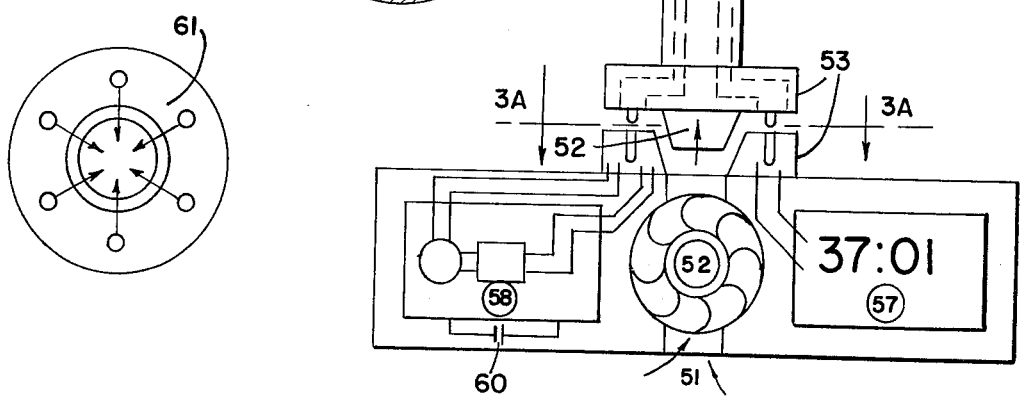
FIG. 1
FIG. 2
FIG. 3
FIG. 1A
FIG. 3A

TOUCH FREE TYMPANIC THERMOMETER

CROSS-REFERENCE TO PRIOR ART AND RELATED APPLICATIONS

This application is an improvement over my related applications, some of which are:
U.S. Pat. No. 3,156,117—Benzinger
U.S. Pat. No. 3,054,397—Benzinger
U.S. Pat. No. 3,626,757—Benzinger
U.S. Ser. No. 745,044, filed Dec. 23, 1977, "FAMILY THERMOMETER".

BRIEF SUMMARY OF THE INVENTION

The present invention relates to a method and apparatus for improved body temperature measurements, and more particularly the invention relates to a device for measurement of body temperature at the tympanic membrane within the ear canal without requiring any physical or mechanical contact with the tympanic membrane.

BACKGROUND OF THE INVENTION

Tympanic thermometry, the most meaningful method for obtaining body temperature, has one limitation: Some individuals feel the touch of a probe at the tympanic membrane as uncomfortable. The invention eliminates the touch of a solid object and replaces it by the soft touch of warm air.

PRINCIPLE OF THE INVENTION

When warm air of a temperature close to tympanic is gently blown against the membrane from a soft, not touching tubing in the ear canal at constant flow rate, the air will return from the dead end through the ear canal and leave with the temperature of the membrane. If the air was slightly cooler, it will have been warmed; if it entered slightly warmer, it will have been cooled before it leaves.

The invention exploits this simple relation by means of a system of concentric tubings and a servomechanism that heats the air that flows forward through the inner tubing, until a pair of thermoelectric junctions, one on the inside of the blow tube, the other on the outside of the blow tube, indicates thermal equilibrium between the ingoing and outgoing air, by zero potential in the thermoelectric circuit. Any deviation from equilibrium-zero potential-activates or de-activates through an amplifier, the heater until equilibrium is restored. A second thermoelectric junction, placed on the inside or outside of the inlet tubing, permits to read the equilibrated temperature of the ingoing and outgoing air and the tympanic membrane. These features of the invention will become more evident in the following description with reference to FIG. 1.

FIELD OF THE INVENTION

It is an object and advantage of the invention to provide a measurement system for body temperature that does not require contact or touching of the tympanic membrane in the ear, and provides improved and accurate measurements of body temperature without physically contacting other than the wall of the ear canal at its orifice, where all conventional ear plugs touch.

A further feature, object and advantage of the invention is to provide a temperature-balanced heat bridge or heat system for deriving accurate measurements of the temperature of the tympanic membrane by air making contact therewith and without physical touching or contact of the membrane.

BRIEF DESCRIPTION OF THE SEVERAL VIEWS OF THE DRAWING

The above and other objects and advantages of the invention will become apparent upon full consideration of the following detailed description and accompanying drawing in which:
FIG. 1 is a sectional view of a touch-free tympanic thermometer apparatus of the present invention according to a best mode thereof;
FIG. 1A is a schematic cross-section taken along lines 1A—1A of FIG. 1;
FIG. 2 is a diagrammatic illustration showing the manner and preferred method of operation of the touch-free tympanic thermometer as inserted within the ear canal;
FIG. 3 is a block and partially schematic diagram of essential components of a system of the invention; and
FIG. 3A is a cross-section taken along line 3A—3A of FIG. 3.

DETAILED DESCRIPTION OF THE PREFERRED EMBODIMENT OF THE INVENTION

Referring now to the drawings there is shown a touch free tympanic thermometer 10 having a cotton plug 11 of approximately one-half inch ($\frac{1}{2}$") diameter being spun around a funnel—or trumpet—shaped small shell 12 of plastic, partly occluded at its upper end 13 to prevent the thermoelectric probing tube 14 of flexible plastic from penetrating into the ear canal after insertion into the shell 12. Only the terminal air inlet tube 15 being highly flexible and of smaller diameter is inserted into and cemented into the thermoelectric probing tube 14 and is permitted to protrude from the shell 12 into the ear canal, at a length of say one centimeter, too short to reach the tympanic membrane as illustrated in FIG. 2. (Its end 14a is rounded to prevent discomfort, should it ever touch.) Multiple holes 16 in the circular barrier of end 13 of the shell 12 serve as outlets for air returning from the tympanic membrane as shown by 'arrows' 16a. The air continues to flow out of the ear canal through channels 17 of the fluted and tapered cylindrical portion of the shell 12, or tube 14, visible in the cross-sectional view 1A—1A of FIG. 1.

At the level where the shell 12 widens in the area 17a as shown the thermoelectric probing tube 14 is equipped with two metal (copper) rings 18, 19 cemented to the inner and outer surface respectively of tube or channel 17. A constantan wire 20 connects these two rings 18, 19 electrically, forming two thermoelectric junctions with copper lead wires 21 soldered to the inner or outer ring, respectively, and emerging at the proximal (instrument) end 22, from the thermoelectric probing tube 14 in terminals 26. The voltage between the two terminals 26 measures the temperature difference between ingoing and outgoing air and maintains it at all times at zero by means of a servomechanism in the instrument which increases or lowers the power supply to a longitudinal heating wire in the proximal part of the thermoelectric probing tube where there is also an inlet for air supplied by a mini-pump. These devices are shown in FIG. 3.

In FIG. 1, soldered to the inner ring 19 in a thermoelectric junction 22 are two terminal leadwires 25, one of a constantan terminal 23, the other of a copper terminal 24. These terminal wires 25 lead to the proximal end 22 of the thermoelectric probing tube and from there into the instrument "black box" (see FIG. 3) where they end in a reference junction between identical metals, and where the potential from the pair of junctions (the measurement thermoelectric junction 22 and the reference junction in the instrument box) is read out in a digital voltmeter (see FIG. 3). It represents the temperature of the tympanic membrane, provided that the potential between terminals 26, 26 indicates zero voltage and zero difference in temperature between the ingoing and outgoing air as it should, when the servomechanism is in action.

FIG. 3 is a block diagram of main components of the invention, those below the lower end of figure. (The lengths of tubing between the lower end of FIG. 1 and the upper end of FIG. 3 is in the order of three feet (3′). The components shown in FIG. 3 are now described as follows:

Through orifice 51 atmospheric air is drawn by a mini-pump 52, and propelled through a tapered tube-disconnect 52 with six electrical connections 53 (five, connecting copper wires and one connecting constantan wire) into the sensor tube 54 (no. 17 in FIG. 1) that carries a twisted heat-wire loop 55, a pair of copper leads 56 (A & B) from the temperature-difference-measuring apparatus numbered 18, 19 in FIG. 1 and one lead each of copper or constantan from the temperature-measuring device numbered 22 in FIG. 1. The temperature-measuring copper and constantan lead-wires connect into a thermoelectric readout instrument 57 showing a digital display of tympanic temperature in this figure. The copper terminals 59 A & B connect into a servo-black box 58 which activates or de-activates through an amplifier. The heater loop 55 whenever terminals 59 A & B show a finite, plus or minus potential. The energy for the heater is supplied from source 60.

A cross-sectional view 61 of the disconnect 52, 53 shows a radial arrangement of the wire-disconnects from which leadwires emerge into the sensor-tube 54 as shown, or into the servo-black box 58 respectively.

The heater-wire loop of FIG. 4 terminates at some distance (say, six inches (6″)) from the temperature-difference and temperature-sensing devices of FIG. 1, to avoid affecting their temperatures.

OPERATION OF THE INVENTION

The user takes one of the disposable cotton plugs 11 in one hand and inserts with the other a semi-disposable thermoelectric probing tube 14 (fully connected to the instrument box) in such a way that the terminal, thin blow tube emerges from the end and protrudes, while the plug and the insert are firmly assembled. Now the combined device is inserted in the orifice of the ear canal 30 to rest there firmly as illustrated in FIG. 2. A switch is turned that energizes an air pump, the heater and the servomechanism as well as the readout circuit. Once the reading has stabilized it is recorded. After the measurement tube is removed from the ear, the plug is discarded.

By means of the present invention, improved and accurate body temperature measurements are achieved by the touch-free tympanic thermometer 40 of the present invention.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What is claimed is:

1. Method for obtaining the temperature of the tympanic membrane comprising passing heated air of a temperature close to tympanic temperature onto a tympanic membrane, whence it returns with the temperature of that membrane, returning said air through a separated path from said heated air, measuring the temperature of the air in said separated path.

2. The method of claim 1 wherein the returned air is of the temperature of the membrane when the passing air is heated to membrane temperature.

3. The method of claim 1 wherein the step of measuring the difference of the temperature of the passing air and the returning air.

4. A touch-free tympanic thermometer comprising a tube passing heated air of a temperature close to tympanic temperature onto a tympanic membrane and from a thermoelectric probing tube, and means measuring the temperature of the air returning outside the tubing yet while inside the ear canal.

5. The invention of claim 4 wherein a pair of thermoelectric junctions or thermistors disposed within said flow path measure the difference in temperature between the ingoing and outgoing air.

6. The invention of claim 5 wherein the difference in temperature between the ingoing and outgoing air is maintained to be zero at all times by means of a servo-heater means activated by the difference in temperature measured in said flow path.

7. The invention of claim 6 wherein metalized outer and inner surfaces in said flow path serve as conductors of electricity from thermoelectric junctions at the inner and outer surfaces thereof.

8. The invention of claim 5 wherein a voltmeter with a commutation switch serves alternatively to read and adjust zero temperature difference between inside and outside of the tube, or the absolute temperature of the air returning through the ear canal, outside the tube.

9. The invention of claim 8 wherein the ear canal is occluded to force the air to exit through a tube surrounding concentrically the tubing through which the heated air enters into the ear canal.

10. The invention of claim 5 wherein the air leaves through recesses at the inside or outside of a fluted and/or tapered tubing, arranged concentrically around the air inlet tubing.

11. The invention of claim 4 wherein the thermoelectric probing tube separates easily from the ear plug, making the latter dispensible, yet tightly fitting therewith.

12. The invention of claim 4 wherein the thermoelectric probing tube is "semi-dispensible" by means of a six-pole disconnect switch means for electrical lead wires, and a disconnect between the tube and an air pump.

13. The invention of claim 12 wherein air is supplied to the thermoelectric probing tube from a small pump.

14. The invention of claim 13 wherein air is supplied to the thermoelectric probing tube from a compressed gas bottle storage.

15. The invention of claim 12 wherein the heater is a wire loop with its turning point near the distal end of the thermoelectric probing tube, whereas the two terminals emerge from the proximal end, and are included in the six-pole disconnect.

16. The invention of claim 4 wherein air is supplied to the thermoelectric probing tube from an empty bottle, through displacement with water by gravity.

17. The invention of claim 4 wherein thermistor means for temperature measuring means are used in lieu of the thermoelectric devices described.

18. The invention of claim 4 wherein a heating-wire loop is deployed in the air supply tube upstream from the sites of the temperature measurements.

19. The invention of claim 4 in which the terminals of the electric heater loop and the leadwires from the temperature and temperature-difference measuring devices exit jointly at the proximal end of the air tube.

20. The invention of claim 4 in which all six electric leadwires and the air tube terminate in a common quick disconnect for airflow and electric lines to be separated from the box containing readouts, amplifiers, power supply mini-air pump and other accessories.

* * * * *